United States Patent
DeLuca

(10) Patent No.: US 9,513,795 B2
(45) Date of Patent: Dec. 6, 2016

(54) SYSTEM AND METHOD FOR GRAPHIC OBJECT MANAGEMENT IN A LARGE-DISPLAY AREA COMPUTING DEVICE

(71) Applicant: BlackBerry Limited, Waterloo (CA)

(72) Inventor: Michael Joseph DeLuca, Boca Raton, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 331 days.

(21) Appl. No.: 13/689,313

(22) Filed: Nov. 29, 2012

(65) Prior Publication Data
US 2014/0145969 A1     May 29, 2014

(51) Int. Cl.
| | |
|---|---|
| G06F 3/041 | (2006.01) |
| G06F 3/0488 | (2013.01) |
| G06F 3/14 | (2006.01) |
| G06F 3/038 | (2013.01) |
| G09G 5/08 | (2006.01) |

(52) U.S. Cl.
CPC ............ *G06F 3/0488* (2013.01); *G06F 3/038* (2013.01); *G06F 3/1423* (2013.01); *G06F 3/1454* (2013.01); *G09G 5/08* (2013.01); *G06F 2203/0383* (2013.01); *G09G 2340/14* (2013.01); *G09G 2354/00* (2013.01)

(58) Field of Classification Search
CPC .... G06F 3/1454; G06F 3/1462; G06F 3/147; G06F 3/1423; G06F 3/0488; G06F 2203/0383; G06F 3/038; G09G 2340/14; G09G 2356/00; G09G 5/08; G09G 2354/00

USPC .................. 345/1.1-3.4, 156–184; 715/863
See application file for complete search history.

(56) References Cited

U.S. PATENT DOCUMENTS

| | | | |
|---|---|---|---|
| 2004/0075623 A1* | 4/2004 | Hartman | G09G 5/397 345/1.3 |
| 2011/0102299 A1* | 5/2011 | Hochmuth | G06F 3/1438 345/1.2 |
| 2011/0225553 A1* | 9/2011 | Abramson | G06F 3/0481 715/863 |

(Continued)

FOREIGN PATENT DOCUMENTS

| | | |
|---|---|---|
| EP | 2372514 | 5/2011 |
| GB | 2451274 | 1/2009 |

OTHER PUBLICATIONS

European Patent Office,"The Extended European Search Report" issued in European Patent application No. 12194746.9, dated Mar. 27, 2013, 6 pages.

*Primary Examiner* — Amare Mengistu
*Assistant Examiner* — Gloryvid Figueroa-Gibson
(74) *Attorney, Agent, or Firm* — Fish & Richardson P.C.

(57) ABSTRACT

A system and method of graphic object management for a large-display area computing device having a large-display area is provided. A touch-sensitive small-display provides a representation of the large-display area including a representation of at least one graphic object displayed on the large-display area such as a desktop of an operating system. Input is received from the touch-sensitive small-display in relation to the representation of the at least one graphic object, such as a window or application. An instruction is provided to the large-display area computing device in response to the received input to the graphic object corresponding to the representation the graphic object.

25 Claims, 8 Drawing Sheets

(56) References Cited

U.S. PATENT DOCUMENTS

2011/0285658 A1* 11/2011 Homma ............... G06F 1/1626
345/173

2012/0050183 A1* 3/2012 Lee ..................... G06F 3/1423
345/173
2013/0027315 A1* 1/2013 Teng .................... G06F 3/0488
345/173

* cited by examiner

SYSTEM AND METHOD FOR GRAPHIC OBJECT MANAGEMENT IN A LARGE-DISPLAY AREA COMPUTING DEVICE

TECHNICAL FIELD

The present disclosure relates to large-display area computing environments and in particular to management of graphic objects, such as windows, across the large-display area.

BACKGROUND

Larger display computing environments are becoming popular as the price of monitors continues to decline and the power of personal computers and tablets increase. A large-display area computing environment can be provided by a computing device, such as a desktop, tablet, or notebook computer providing video output to a single large monitor or by combining multiple monitors to create a large-display area. A multi-monitor configuration may comprise monitors of various sizes which when combined provide a large-display area for displaying a computing environment. Simultaneous access to large amounts of information displayed in multiple windows in a large-display area can significantly increase productivity of a user. However, in such large-display systems window management with a conventional input device such as a mouse or touchpad is tedious at best, and at worst extremely difficult to accomplish. For example, to move a window between monitors or across a large-display area, first the mouse cursor must be located, then the title bar of the desired window must be located and dragged to the appropriate monitor with the mouse, this may require large traversals across multiple monitors which may exceed the movement distance allotted for by a typical mouse pad, thereby requiring multiple movements to accomplish the task.

Working in a large-display area computing environment can be complicated by the simple difficulty of locating the mouse cursor on a large-display area, further if the title bar for a desired window is covered by another window, the other window must be moved to expose the title bar and then the desired window moved. This results in a lot of locating, dropping and dragging with a mouse. Also even if all monitors were eventually to be touch-sensitive, using a touch screen interface on multiple monitors for window management could be even more complex because of the physical separation of multiple monitors and the large physical distance needed for gestures to move and manage various windows can exceed the user's comfortable range of motion.

Accordingly, systems and methods that enable improved management of graphic objects, such as windows, across a large-display area remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In accordance with an aspect of the present disclosure there is provided a method of graphic object management for a large-display area computing device having a large-display area, the method comprising: displaying on a touch-sensitive small-display a representation of the large-display area including a representation of at least one graphic object displayed on the large-display area; receiving an input from the touch-sensitive small-display in relation to the representation of the at least one graphic object; and providing at least one instruction to the large-display area computing device in response to the received input to the at least one graphic object, the large-display area computing device performing an action on the at least one graphic object in response to the at least one instruction.

In accordance with another aspect of the present disclosure there is provided a system for graphic object management, the system comprising: a large-display area computing device having a large-display area; and a touch-sensitive small-display coupled to the large-display area computing device providing a representation of at least one graphic object, the touch-sensitive small-display coupled to the large-display area computing device wherein movement of the representation of the at least one graphic object on the touch-sensitive small-display moves a corresponding graphic object on the large-display area.

In accordance with yet another aspect of the present disclosure there is provided a non-transitory computer readable memory containing instructions for graphic object management for a large-display area computing device having a large-display area, the instructions when executed by a processor performing: displaying on a touch-sensitive small-display a representation of the large-display area including a representation of at least one graphic object displayed on the large-display area; receiving an input from the touch-sensitive small-display in relation to the representation of the at least one graphic object; and providing at least one instruction to the large-display area computing device in response to the received input to the at least one graphic object, the large-display area computing device performing an action on the at least one graphic object in response to the at least one instruction.

Embodiments are described below, by way of example only, with reference to FIGS. 1-8.

Figure 1:
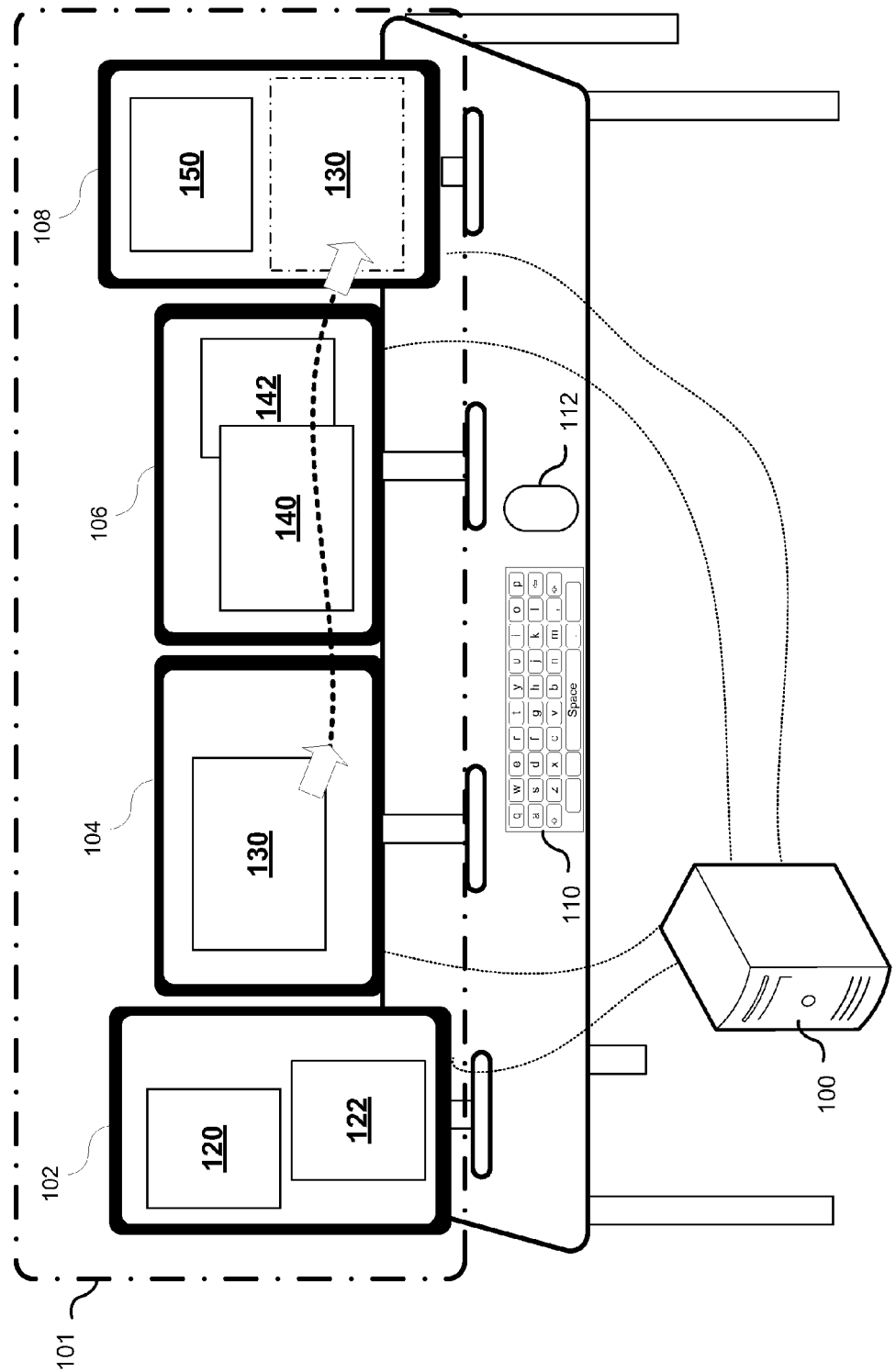
FIG. 1 shows a representation of a large-display area computing environment.

FIG. 1 shows a representation of large-display area computing environment. The large-display area 101 comprises multiple monitors 102, 104, 106 and 108 coupled to a computing device 100 such as a personal computer, notebook computer, and tablet capable of providing video to a large or multi-monitor display environment. Although multiple monitors are shown, the large-display area computing environment may be comprised of a single large-display. A single large display may be a conventional high definition monitor or an alternative monitor such as an ultra high definition monitor capable of significantly higher definitions and/or larger display areas. The large-display area 101 provides an environment to allow the user to interact with graphic objects displayed in a graphical user interface of an operating system. The graphic objects may be content or applications presented in a windowed or tiled type operating system for example in Windows™, OSX™, and Linux operating systems. Multiple graphic objects may be displayed in the large-display area, for example monitor 102 shows two graphic object 120 and 122, monitor 104 shows a single graphic object 130, monitor 106 shows two graphic objects 140 and 142 and monitor 108 shows a graphic object 150. The graphic object may be an object that is moveable within the desktop environment such as but not limited to mail application, document productivity applications, document viewers, multimedia players, web browsers, widgets, notifications, games, control interfaces, etc. . . . . While using the computing device 100, the user may interface with a keyboard 110, mouse 112 or other user interfaces such as touch-interface to interact with the graphic objects. The graphic objects can be moved between monitors by selection from an input device, for example mouse 112, and dragged across the large display area, such as desktop, to another monitor for placement. For example the graphic object 130 is presented on monitor 104 must be dragged across monitor 106 to be placed on monitor 108. This action can require numerous movements of the input device, such as a mouse, or swipes across screens if a touch interface is utilized making the movement of graphic objects in large-display area computing environments tedious.

Figure 2:
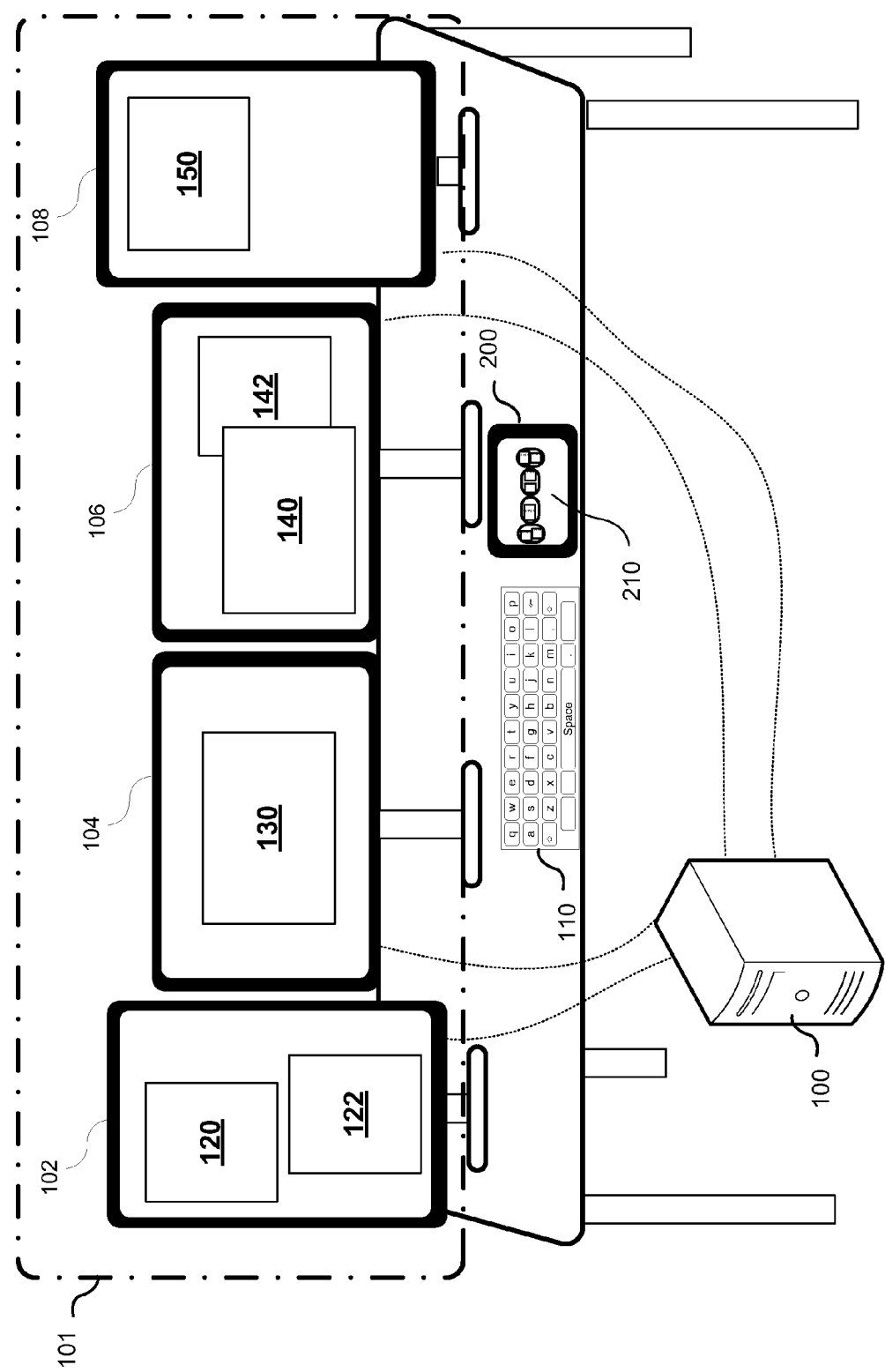
FIG. 2 shows a representation of a large-display area computing environment coupled to a touch-sensitive small-display.

FIG. 2 shows a representation of a large-display area computing environment coupled to a touch-sensitive small-display. A touch-sensitive small-display 200 is coupled to the large-display area computing device 100. When the touch-sensitive small-display 200 is remote from the large-display area computing device, it may be implemented on a computing device providing wireless networking capability by for example interfaces such as a wide-area wireless network (WAN) technologies to communicate with the computing device 100 such as for example GMS, HSPA, CDMA, W-CDMA, LTE, and IEEE 802.16 standard technologies or wireless local area network (WLAN) technology such as Wi-Fi (IEEE 802.11 standard) or short range communication technologies such as provided by Bluetooth™. Alternatively the touch-sensitive small-display may utilize a direct wired connection such as universal serial bus (USB) to the computing device 100. The touch-sensitive small-display 200 may be provided by a tablet or Smartphone device having a small display area. The touch-sensitive small-display 200 provides a representation 210 of the large-display area 101 graphically and the graphic objects positioned therein. The representation or the large-display area 101 may identify the monitors 102-108 making up the large-display area and their relative physical size and position. The touch-sensitive small-display 200 is bridged to the computing device 100 enabling them to operate synergistically as one device rather than two standalone devices. A pointing device such as mouse 112 (not shown) may be used with keyboard 110 as part of the user interface. Alternately, device 200 may further perform at least some of the user interface functions of the pointing device. The graphic objects 120-150 can be moved easily between monitors 102-108 by use of the smaller touch-sensitive small-display 200. The user can interact with the graphic object through gestures on the small-display and not require an input device that requires excessive movement to move graphic objects within the large-display area 101. The large-display area may be defined relatively to the touch-sensitive small-display area as being larger than the small display area. The large-display area 101 may comprise displays such as computer or notebook monitors, projectors, or surface displays; such display areas are typically larger than eleven inches. Whereas the small-display are may be a touch-sensitive tablet or touch-sensitive computing device such as a Smartphone which typically have display areas smaller than eleven inches thereby providing for a more portable form factor.

Figure 3:
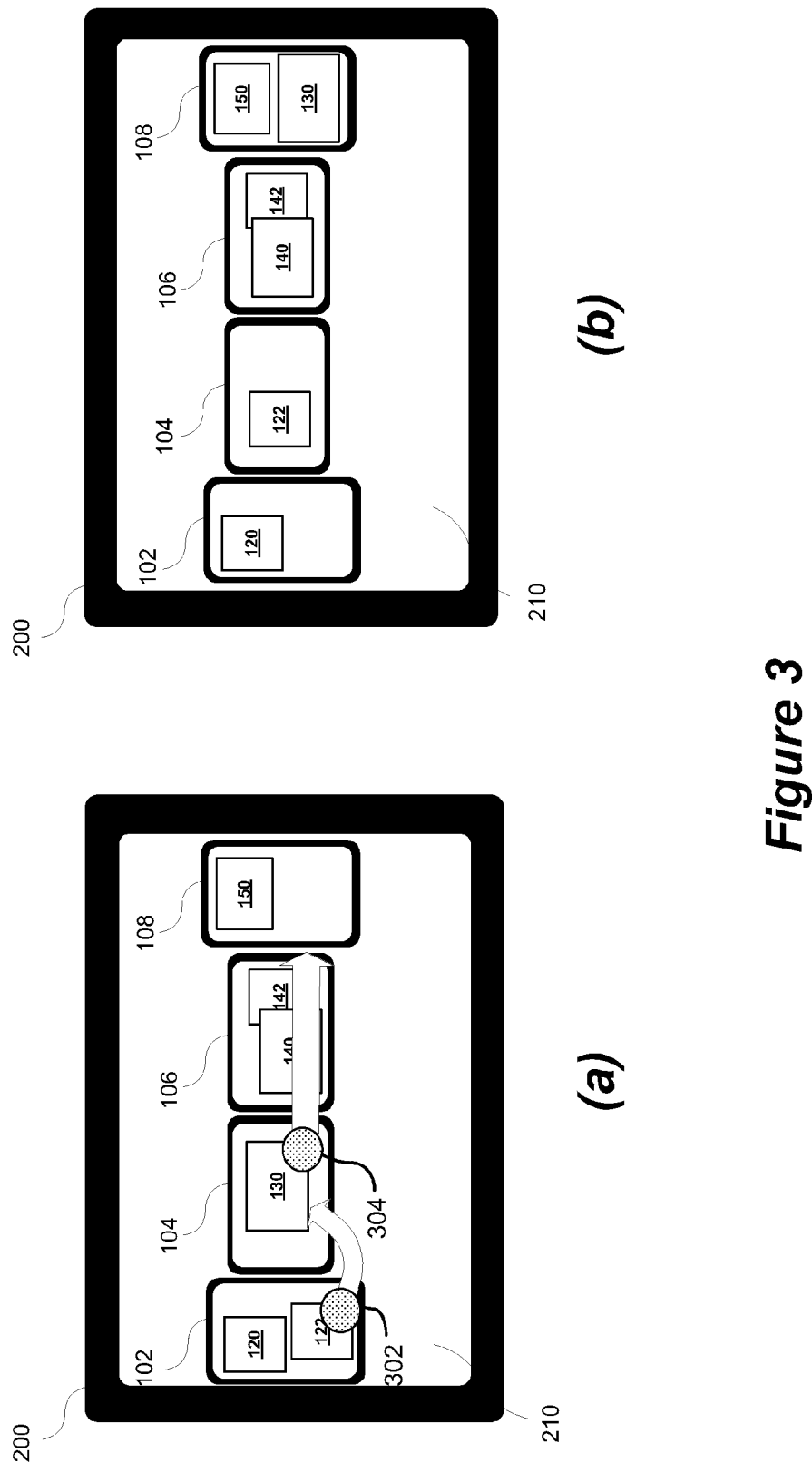
FIGS. 3 (*a*) and 3(*b*) show presentations of the large-display area computing environment on the touch-sensitive small-display.
Figure 4:
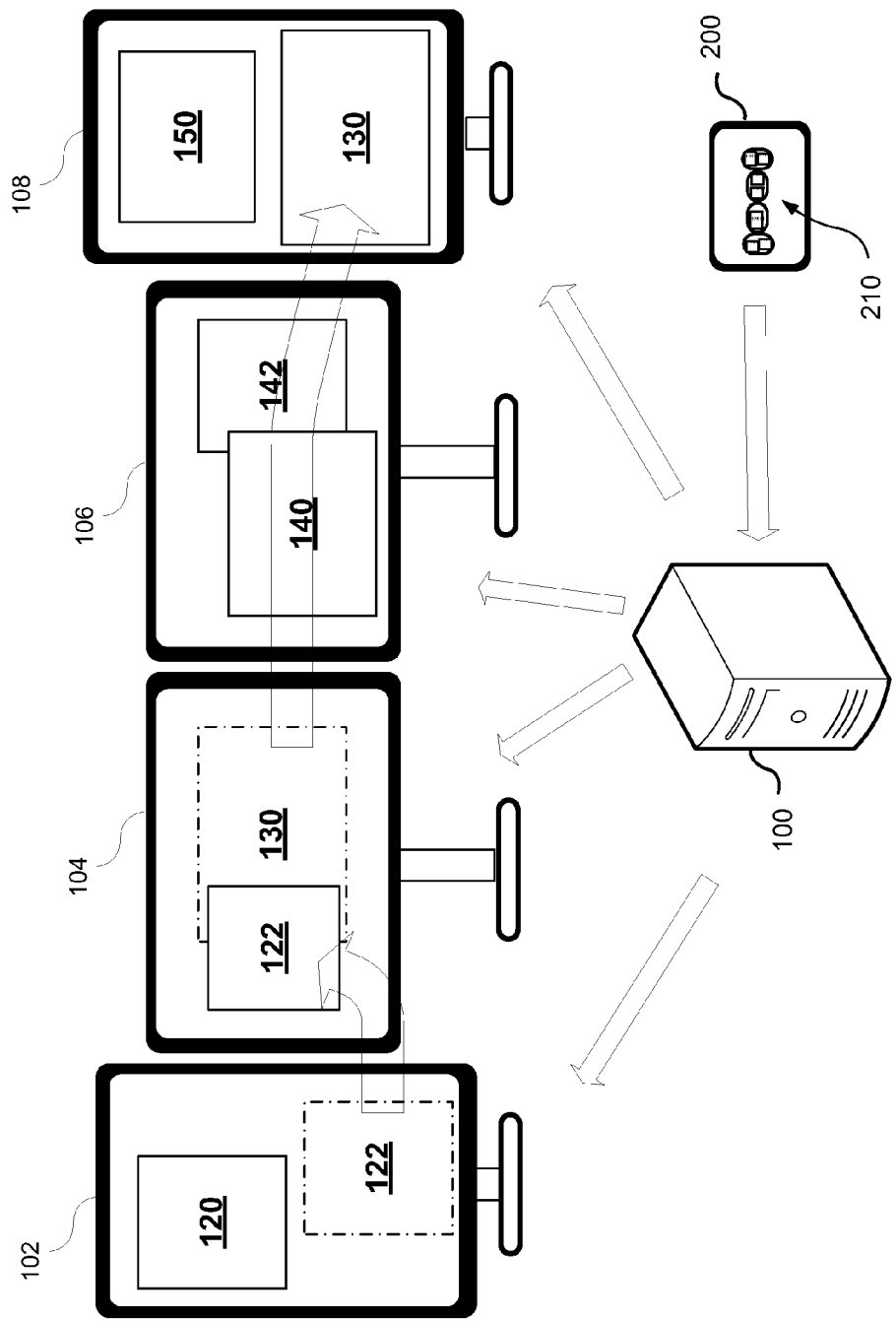
FIG. 4 shows a representation of graphic object repositioning in the large-display area computing device based on interaction of the touch-sensitive small-display as in FIG. 3.

FIGS. 3(*a*) and 3(*b*) show representations of a presentation of the large-display area computing environment on the touch-sensitive small-display. The touch-sensitive small-display computing device 200 operates in a bridged communication mode with the large-display computing device 100, where interactions with the touch-sensitive small-display computing device 200 are reflected on the computing device 100 operating environment. The display 210 shows a representation of the large-display area 101 comprising the monitors 102-108 and the graphic objects 120-150. The graphic objects 120-150 displayed on display 200 may appear as optically reduced images of the corresponding objects displayed on the larger display area 101, or in a different embodiment may show less of the content of the object. For example, if object 130 was a titled window with two columns of text in display 101, object 130 in display 200 could legibly display a representation of the window title along with two shaded areas representing the two corresponding columns of text. As shown in FIG. 3(*a*), touch contacts on the device can be used to move representative graphic objects between the monitors 102-108 comprising the large-display area 101. For example a touch contact 302, which may form part of a gesture, on graphic object 122 on the touch-sensitive small-display computing device 200, can move the graphic object 122 from monitor 102 to monitor 104 in a single gesture. In contrast movement using traditional input devices such as a mouse 112 would require multiple motions or gestures to perform the same action. Similarly, a touch contact 304 on graphic object 130 on the touch-sensitive small-display computing device 200 can move the graphic object 130 from monitor 104 to monitor 108 with a simple gesture. The image or information used to generate the representation on the touch-sensitive small-display 200 is received at the computing device 100, such as a tablet/PC, over the communication bridge between the devices. As shown in FIG. 3(*b*) and referring to FIG. 4, the gestures 302 and 304 result in the movement of the respective graphic objects 122 and 130, such as a window, between the monitors 102-108 with an updated display on the touch-sensitive small-display 200. The respective graphic objects 120-150 are then also moved between monitors in the large-display area 101 by the interaction with the touch-sensitive small-display 200.

Although the interaction on the touch-sensitive small-display 200 are described as touch contact, various inputs or gestures formed by the touch contact may be used to perform a variety of actions in the large-display computing environment 101 on the computing device 100. For example a tapping gesture on a graphic object on the touch-sensitive small-display 200 can make it the active window on the large-display computing device 100 on respective monitor. If it were a window with a document, for example word, spreadsheet, PowerPoint, etc. . . . , and then further keyboard entries could be made on the document without use of the mouse to identify the active window. Furthermore, the cursor could be placed in the approximate location of the tap, or touch contact, and more accurate cursor placement could be further enhanced with cursor "snapping" processes. If multiple graphic objects are overlaid on top of each other the tapping gesture could bring the graphic object to the front of other graphic objects and make it the active window on the large-display computing device 100. A tap and hold on the graphic object could place it on top and expand it to the fill the entire area of monitor. Or conversely, if it was already expanded, tapping and holding the graphic object window could contract it back to its current state. A double tap of a graphic object could shrink it to the taskbar or dock exposing any windows underneath on the monitor would be displayed.

Gestures may also be defined by control or interaction with all or a subset of graphic objects, for example a multi-finger expansion may distribute or tile the windows across the multiple monitors. A pinch gesture may close or minimize one or more windows on the respective display or across respective monitors. In addition kinetic aspects of the gestures may also be utilized to defined movement of the graphic object between windows, for example the speed at which a gesture, such as a flick of a finger, is performed may be used to determine the distance that the graphic object may travel within the large-display display area 101. The inputs provided by gestures are some examples of using a bridged small-display computing device to control graphic objects such as windows displayed in a large-display or multiple-monitor display environment. It should be apparent that other gestures, including three-dimensional touch or touch free gestures made relative to the small display device, can be used to accomplish similar results; also several further window operations are readily anticipated.

Figure 5:
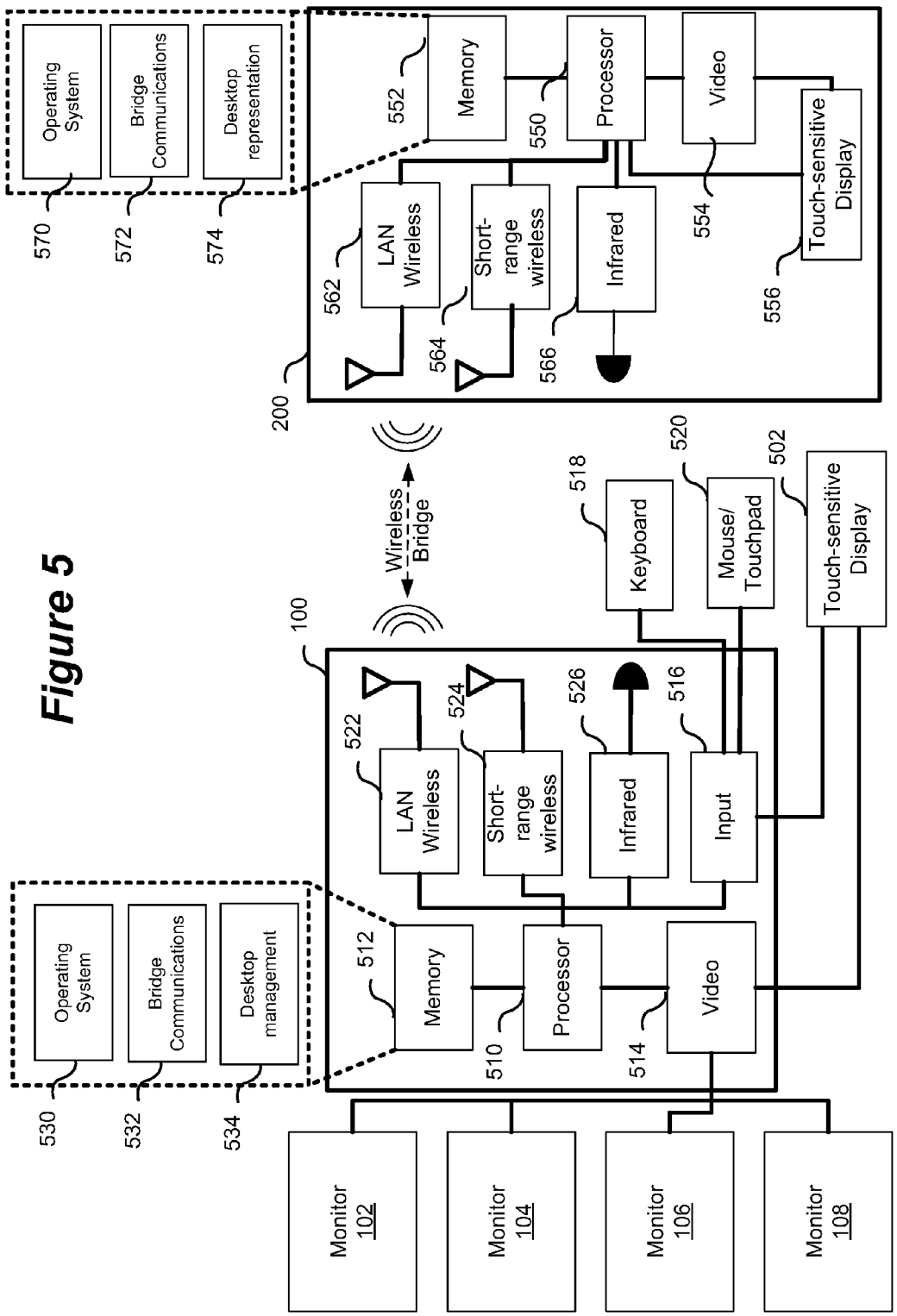
FIG. 5 shows schematic representation of a large-display area computing device and a touch-sensitive small-display.

FIG. 5 shows schematic representation of a large-display area computing device and a touch-sensitive small-display or touch-sensitive small-display computing device. The large-display area computing device 100, may be a personal computer, notebook computer, server, or tablet device capable of providing video to at least a large-display or multiple displays such as multiple monitors 102-108. The large-display area computing device 100 has at least a processor 510, memory 512 and video output driver 514. The processor 510 may be connected to one or more wireless network interfaces such as a local area network transceiver 522, a short-range wireless transceiver 524, or an infrared transceiver 526 and an input interface 516. The input interface 516 may be coupled to one or more input devices such as a keyboard 518, mouse or trackpad 520. The large-display area computing device may also coupled directly to the touch-sensitive small-display 502, which may also be coupled to the video output driver 514, but may be interfaced through direct communication such as universal serial bus (USB) to provide video information directly to the touch-sensitive small-display 502. Instructions for the memory 512 provides functionality such as an operating system 530, bridge communications 532 functionality and desktop management 534 functionality. The bridge communications 532 functionality can be used to establish a connection with a touch-sensitive small-display computing device 200 and enable transfer of the representation of the large-display area 101. The bridge communication may use wireless communications to establish a secure communication between devices and enable interaction there between. The desktop management 534 functionality enables identification of the graphic objects presented in the large-display area 101 of the large-display area computing device 100 by receiving instructions from the touch-sensitive small-display 502 or touch-sensitive small-display computing device 200.

If the touch-sensitive small-display functionality is implemented in a separate computing device 200, it may have a processor 550, memory 552 and output video driver 554. The touch-sensitive small display device 200 may be a Smartphone or tablet, having a display area relatively smaller than the large-display area, capable of performing communication functions through one or more wireless interfaces, such as a local area network transceiver 562, a short-range wireless transceiver 564, or an infrared transceiver 566. A touch-sensitive display 556 is coupled to the processor 550 and receives touch contact inputs and gestures. The memory 552 provides functionality such as an operating system 570, bridge communications 572 functionality and desktop representation 574 functionality. The bridge communications 532 functionality can be used to establish a connection with the large-display area computing device 100 and enable reception of representation information from the large-display area computing device 100 and transfer of interaction instructions from the touch-sensitive small-display computing device 200. The bridge communication may use wired or wireless communications to establish a secure communication with the large-display area computing device 100. The desktop management 574 functionality displays the large-display area 101 and enables identification of the graphic objects presented in the large-display area 101 and sending instructions to the large-display area computing device 100.

Figure 6:
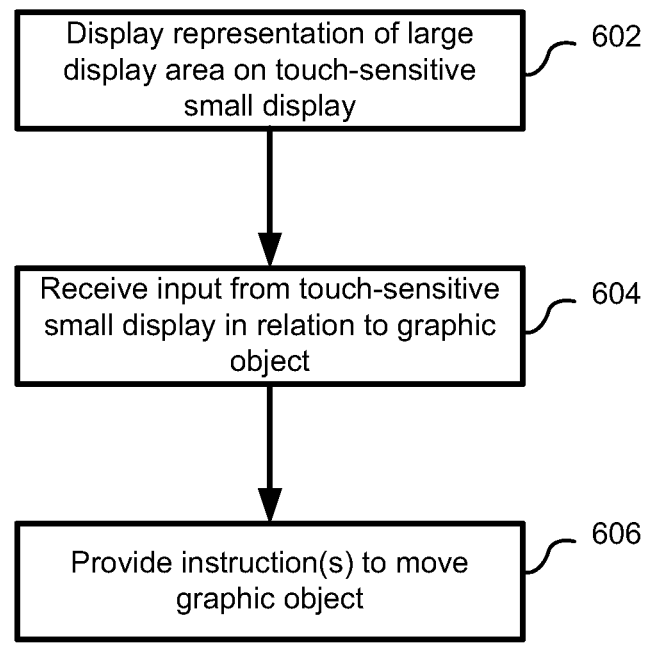
FIG. 6 shows a method of graphic object management for a large-display area computing device.

FIG. 6 shows a method of graphic object management for a large-display area computing device. A representation of the large-display area is displayed on a touch-sensitive small-display (602). The representation includes a representation of at least one graphic object displayed on the large-display area. For example the large-display area may define a desktop environment and the graphic objects defining windows within the desktop environment. An input is received from the touch-sensitive small-display in relation to the representation of the at least one graphic object (604). The input is a touch contact which may be part of a gesture input. At least one instruction is then provided to the large-display area computing device in response to the received input to the at least one graphic object corresponding to the representation of the at least one graphic object (606). The large-display area computing device can then move the graphic object within the display area, for example between multiple monitors in response to the gesture.

Figure 7:
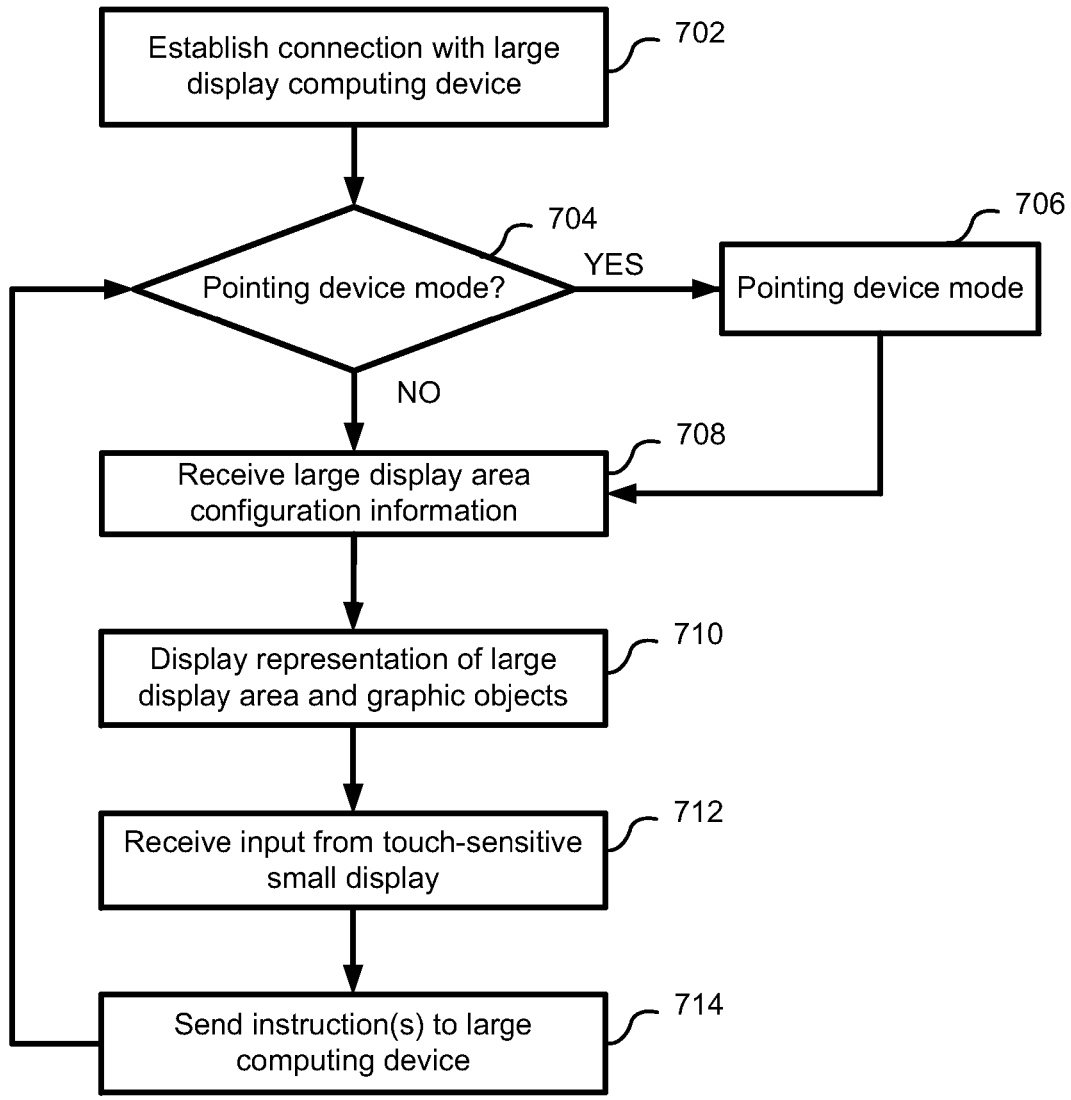
FIG. 7 shows graphic object management for a large-display area computing device on a touch-sensitive small-display computer device.

FIG. 7 shows graphic object management for a large-display area computing device on a touch-sensitive small-display computing device. A connection is established from the touch-sensitive small-display computing device with the large-display area computing device (702). The connection may be established by an application executed on a processor of the touch-sensitive small-display computing device. The application communicating with a receiving application on the large display communication device through a wireless interface. The touch-sensitive small-display computing device may also be configured to operate as a pointing device (YES at 704), such as a motion tracking mouse to move a cursor on the large-display area computing device. A motion tracking mouse may be implemented using optical motion tracking, accelerometer measurements, mechanical movement tracking other approaches known to those familiar with the art. If the touch-sensitive small-display computing device is in a pointing device mode (706), an input received at the touch-sensitive display is used to track a pointer on the screen of the display. Gestures may be utilized to direct the input to different monitors in a multi-monitor configuration; however movement of any graphic objects would require multiple movements or gestures on the touch-sensitive display consistent with movement of the object across the monitors. If the touch-sensitive small-display computing device is in a large-display area representation mode only (NO at 704), once the bridge is established configuration information is received from the large-display area computing device (708) identifying the display layout and representation of the graphic objects that are present and can be moved. A representation on the touch-sensitive small-display computing device is then displayed showing the layout of the large-display area on the single touch-sensitive small-display and representation of the graphic objects (710). Input is then received on the touch-sensitive small-display (712) and sent to the large-display area computing device (714). Updates are subsequently provided from the large-display area computing device (708) as required.

Figure 8:
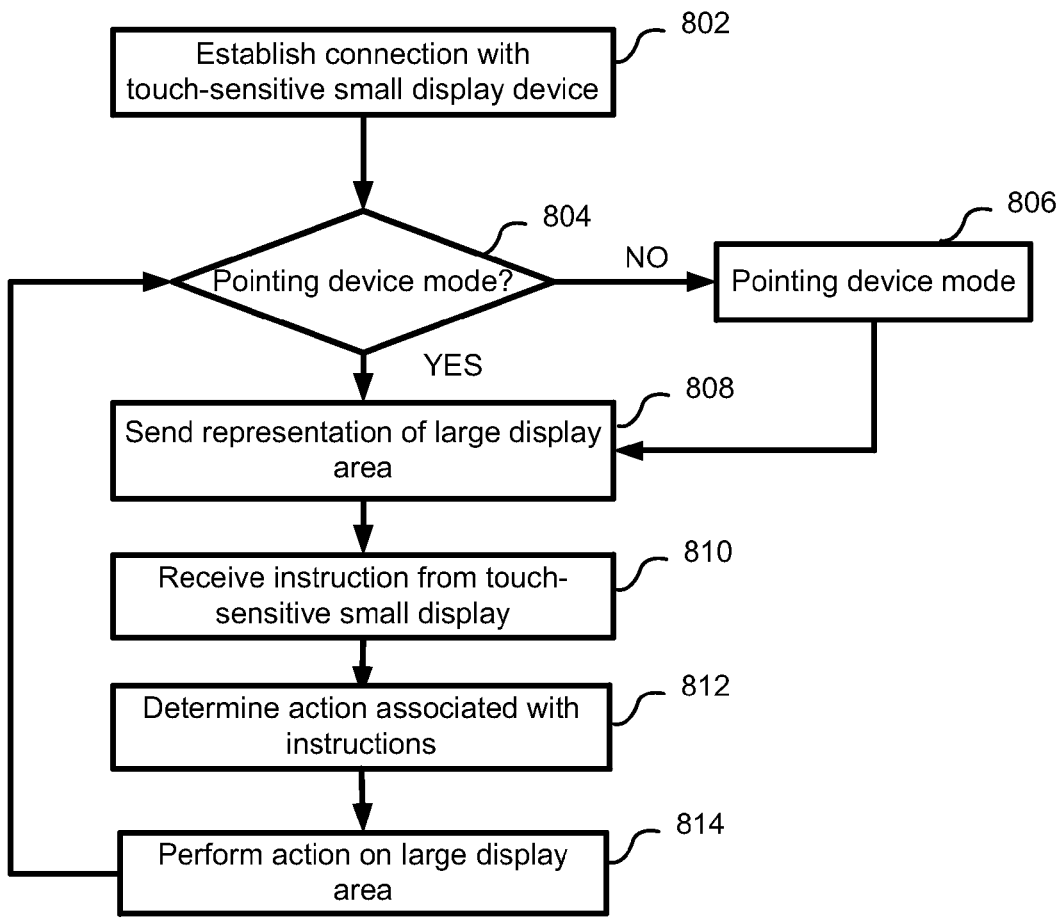
FIG. 8 shows graphic object management on a large-display area computing device using a touch-sensitive small-display computing device.

FIG. 8 shows graphic object management on a large-display area computing device using a touch-sensitive small-display. A connection is established from the large-display area computing device and the touch-sensitive small-display computing device (702). The large-display area computing device may execute an application for establishing the bridge with the touch-sensitive small-display computing device through a wireless connection. The bridge application, or another application communicating through the bridge application, provides instructions or data to generate a representation of the large-display area environment, such as a desktop of an operating system, on the small-display area computing device. The touch-sensitive small-display computing device may also be configured to perform as a pointing device (YES at 804), such as a mouse to move a cursor on the large-display area computing device. If the touch-sensitive small-display computing device is in a pointing device mode (806) and input from the touch-sensitive display is received and is used to track a pointer on the screen of the display. If the touch-sensitive small-display computing device is in a large-display area representation mode only (NO at 804), once the bridge is established configuration information is sent from the large-display area computing device to the touch-sensitive small-display computing device (808) identifying the display layout and representation of the graphic objects that are present and can be moved. Instructions are then received from the touch-sensitive small-display computing device (810) identifying either the input that was received on the touch-sensitive small-display computing device or actions to be performed on the particular graphic objects displayed in the large-display area. The type of instructions received may be dependent on how the connection between the touch-sensitive small-display computing device is initiated. For example if the touch-sensitive small-display is directly connected to the large-display area computing device, the large-display area computing device may provide the image that is display on the touch-sensitive small-display computing device and determine the type of interactions that occur with the representation of the large-display area and the graphic objects, alternatively motion vectors or commands associated with touch contacts input may be provided. Actions based upon the instructions are determined (812) and performed on the graphic objects presented in the large-display area (814). Further updates are provided from the touch-sensitive small-display computing device (808).

Although the description discloses example methods, system and apparatus including, among other components, software executed on hardware, it should be noted that such methods and apparatus are merely illustrative and should not be considered as limiting. For example, device 200 could take the form of a dedicated touch display without smartphone of tablet functionality, or it could that the form of a mouse with an integral touch display that includes the object management functionality described herein. It is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

In some embodiments, any suitable computer readable memory can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable memory that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

The invention claimed is:

1. A method of graphic object management for a large-display area computing device having a large-display area having multiple monitors, the method comprising:
   receiving, from the large display area computing device, information identifying a physical arrangement and physical orientation of the multiple monitors of the large-display area computing device;
   displaying on a touch-sensitive small-display a representation of the physical arrangement and physical orientation of the multiple monitors of the large-display area based on the information identifying the physical arrangement and physical orientation of the multiple monitors, and simultaneously displaying on the touch-sensitive small-display a representation of at least one graphic object displayed on the large-display area;
   receiving an input from the touch-sensitive small-display in relation to the representation of the at least one graphic object; and
   providing at least one instruction to the large-display area computing device in response to the received input to the at least one graphic object, the large-display area computing device caused to perform an action on the at least one graphic object in response to the at least one instruction.

2. The method of claim 1 wherein:
   receiving the input from the touch-sensitive small-display comprises an input to reposition the representation of the at least one graphic object; and providing the at least one instruction to the large-display area computing device to move the at least one graphic object corresponding to the at least one repositioned representation from a respective monitor to another one of the multiple monitors.

3. The method of claim 1 wherein the input from the touch-sensitive small-display is a touch contact, the at least one instruction performing an action on the at least one graphic object based on the touch contact.

4. The method of claim 1 wherein the large-display area computing device includes a first user interface for modifying the contents of the graphic object and moving the graphic object and further wherein the touch-sensitive small-display is provided by a touch-sensitive small-display computing device optionally coupled to the large-display area computing device and touch inputs to the touch-sensitive small-display computing device do not provide for modification of the contents of the graphic object.

5. The method of claim 4 wherein the at least one instruction is provided wirelessly from the touch-sensitive small-display to the large-display area computing device.

6. The method of claim 4 further comprising establishing a communications bridge between the touch-sensitive small-display computing device and the large-display area computing device.

7. The method of claim 6 wherein the touch-sensitive small-display computing device is a Smartphone or tablet that operates an application for interfacing with the large-display area computing device in response to establishment of the communications bridge.

8. The method of claim 7 wherein the large-display area computing device includes a desktop or notebook computer.

9. The method of claim 4 wherein the touch-sensitive small-display is movable relative to the large-display area and further operates as a pointing device input for the first user interface.

10. The method of claim 1 wherein the touch-sensitive small-display is coupled directly by a wired connection to the large-display area computing device.

11. The method of claim 1 wherein the large-display area computing device executes an application for:
sending display information to the touch-sensitive small-display, the display information identifying the representation of the at least one graphic object displayed on the large display area;
receiving the at least one instruction from the touch-sensitive small-display;
determining an action associated with the at least one instruction; and
performing the action on the at least one graphic object displayed on the large-display area.

12. The method of claim 11 wherein each of the at least one graphic object is a window of a windowed operating system provided by the large-display area computing device wherein the representation of the least one graphic object is a representation of the window wherein the action performs one or more of: selecting the window, bringing the window to the foreground, moving the window, maximizing the window, and minimizing the window.

13. The method of claim 1 wherein each of the at least one graphic object is a window of a windowed operating system provided by the large-display area computing device wherein the representation of the least one graphic object is a representation of the window.

14. The method of claim 1 wherein the graphic object is a representation of an application executed on the large-display area computing device.

15. The method of claim 1 wherein the input from the touch-sensitive small-display comprises a touch gesture, the at least one instruction performing an action on the at least one graphic object based on the touch gesture.

16. A system for graphic object management, the system comprising:
a large-display area computing device having a large-display area having multiple monitors; and
a touch-sensitive small-display coupled to the large-display area computing device providing a representation of a physical arrangement and physical orientation of the multiple monitors of the large-display area computing device, and simultaneously displaying on the touch-sensitive small-display a representation of at least one graphic object, the touch-sensitive small-display coupled to the large-display area computing device wherein the large-display area computing device provides information identifying the physical arrangement and physical orientation of the multiple monitors to the touch-sensitive small-display and wherein movement of the representation of the at least one graphic object on the touch-sensitive small-display causes movement of a corresponding graphic object on the large-display area.

17. The system of claim 16 wherein each of the at least one graphic object is a window of a windowed operating system provided by the large-display area computing device wherein the representation of the least one graphic object is a representation of the window.

18. The system of claim 16 wherein an input from the touch-sensitive small-display is a touch contact, the movement of the representation of the at least one graphic object based on the touch contact.

19. The system of claim 16 where in the touch-sensitive small-display is provided by a touch-sensitive small-display computing device.

20. The system of claim 19 wherein the movement of the representation is conveyed wirelessly from the touch-sensitive small-display computing device to the large-display area computing device.

21. The system of claim 20 further comprising establishing a communications bridge between the touch-sensitive small-display computing device and the large-display area computing device.

22. The system of claim 21 wherein the touch-sensitive small-display computing device is a Smartphone or tablet that operates an application for interfacing with the large-display area computing device in response to establishment of the communications bridge.

23. The system of claim 16 wherein the touch-sensitive small-display is coupled directly by a wired connection to the large-display area computing device.

24. The system of claim 16 wherein the touch-sensitive small-display is further movable relative to the large-display area and operates as a pointing device input, the touch-sensitive small-display assignable to pointing device input on at least one of the multiple monitors.

25. A non-transitory computer readable memory containing instructions for graphic object management for a large-display area computing device having a large-display area having multiple monitors, the instructions when executed by a processor performing:
receiving, from the large display area computing device, information identifying a physical arrangement and physical orientation of the multiple monitors of the large-display area computing device;

displaying on a touch-sensitive small-display a representation of the physical arrangement and physical orientation of the multiple monitors of the large-display area based on the information identifying the physical arrangement and physical orientation of the multiple monitors, and simultaneously displaying on the touch-sensitive small-display a representation of at least one graphic object displayed on the large-display area;

receiving an input from the touch-sensitive small-display in relation to the representation of the at least one graphic object; and providing at least one instruction to the large-display area computing device in response to the received input to the at least one graphic object, the large-display area computing device causing to perform an action on the at least one graphic object in response to the at least one instruction.

* * * * *

UNITED STATES PATENT AND TRADEMARK OFFICE
CERTIFICATE OF CORRECTION

| | | |
|---|---|---|
| PATENT NO. | : 9,513,795 B2 | Page 1 of 1 |
| APPLICATION NO. | : 13/689313 | |
| DATED | : December 6, 2016 | |
| INVENTOR(S) | : DeLuca | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 395 days.

Signed and Sealed this
Tenth Day of July, 2018

Andrei Iancu
*Director of the United States Patent and Trademark Office*